United States Patent [19]

Le Roy

[11] 4,433,642
[45] Feb. 28, 1984

[54] DRINKING TROUGH FOR POULTRY

[76] Inventor: Ernest Le Roy, 48, rue Monsieur Vincent, 35100 Rennes, France

[21] Appl. No.: 364,488

[22] Filed: Apr. 1, 1982

[51] Int. Cl.³ .............................................. A01K 7/02
[52] U.S. Cl. ..................................................... 119/78
[58] Field of Search ....................... 119/72, 78, 79, 80, 119/51.5

[56] References Cited

U.S. PATENT DOCUMENTS

| | | | |
|---|---|---|---|
| 3,063,417 | 11/1962 | Blosser | 119/79 |
| 3,157,160 | 11/1964 | Osier | 119/79 |
| 3,610,206 | 10/1971 | Davis | 119/78 |
| 3,861,358 | 1/1975 | Bowell | 119/79 |
| 4,054,106 | 10/1977 | Dean | 119/51.5 |

*Primary Examiner*—Hugh R. Chamblee
*Attorney, Agent, or Firm*—Browdy and Neimark

[57] ABSTRACT

The invention relates to improvements to water distribution devices used in intensive poultry raising facilities.

The new drinking trough has a cover (2) in the shape of a truncated cone, open at its upper end to allow a hollow rod (3) to pass, which rod attached a base or plate (1) whose ends are shaped as troughs (5) which can communicate by orifices (8) with a cavity (7) provided on said base. The supply of water is controlled by valve (16) and float (18) inside the drinking trough. The trough (5) can be put in communication with adjacent reservoirs for young poultry supplied at a constant level. Further, the trough (5) can receive small gutters or be replaced by reservoirs suited for various types of poultry, especially very young poultry.

7 Claims, 12 Drawing Figures

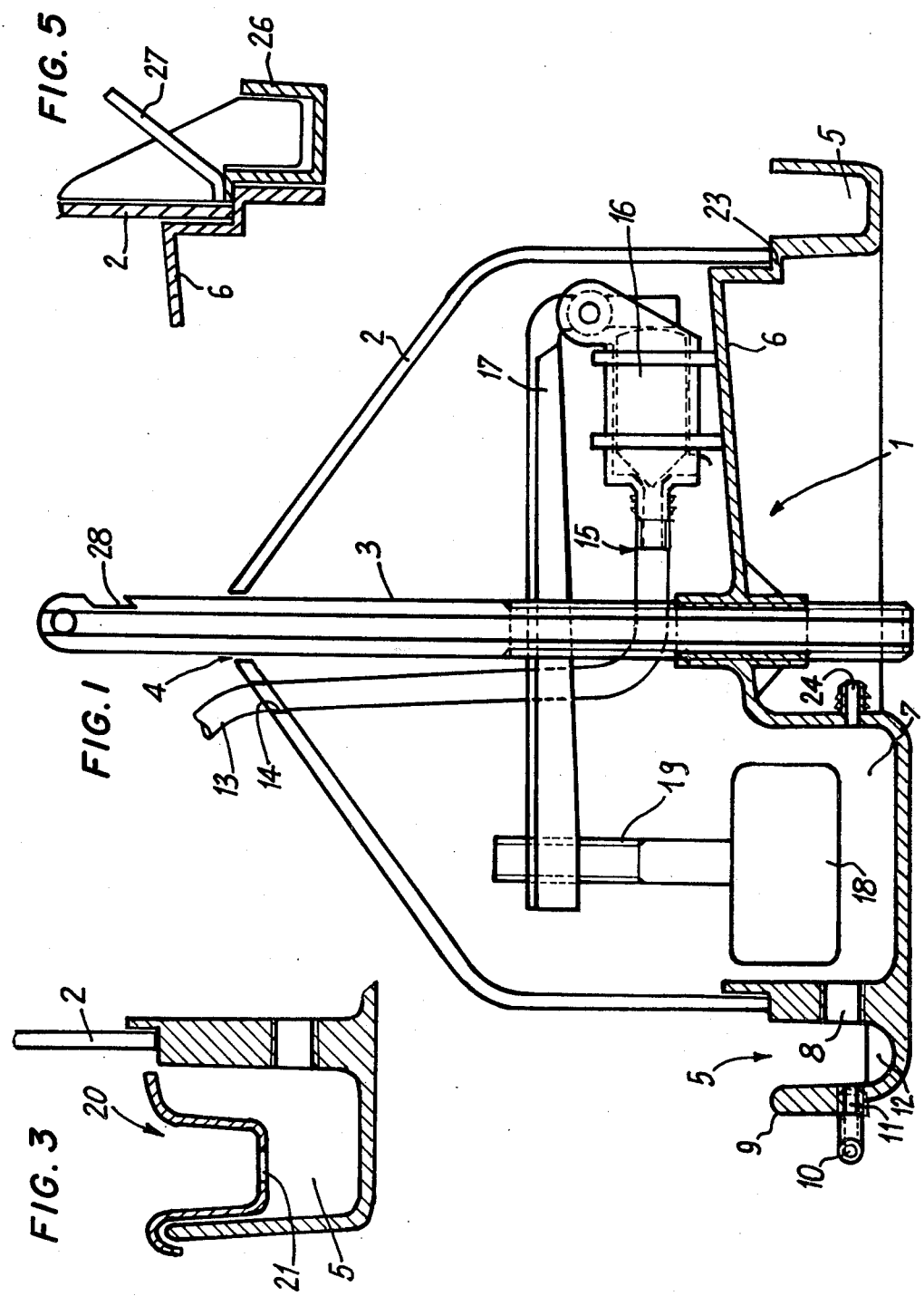

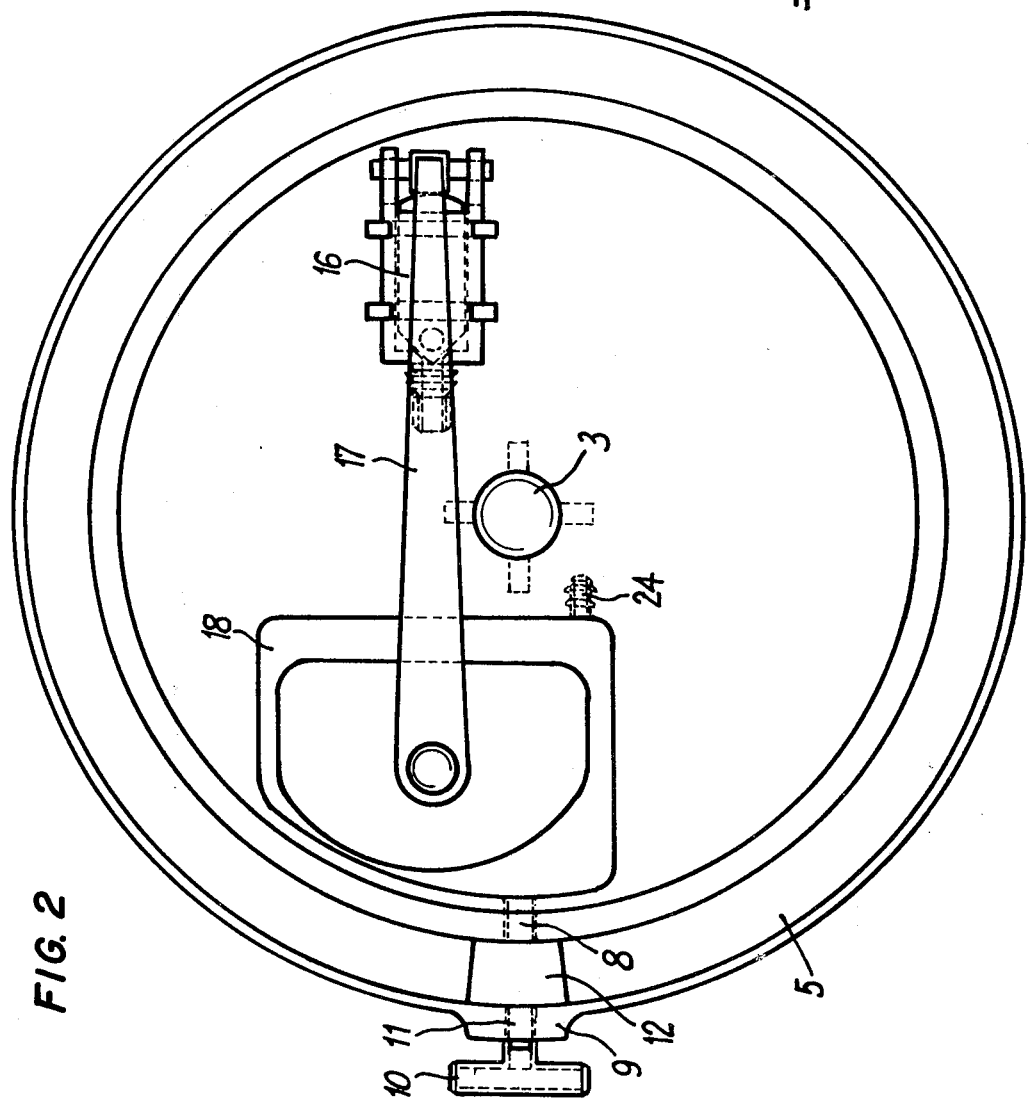

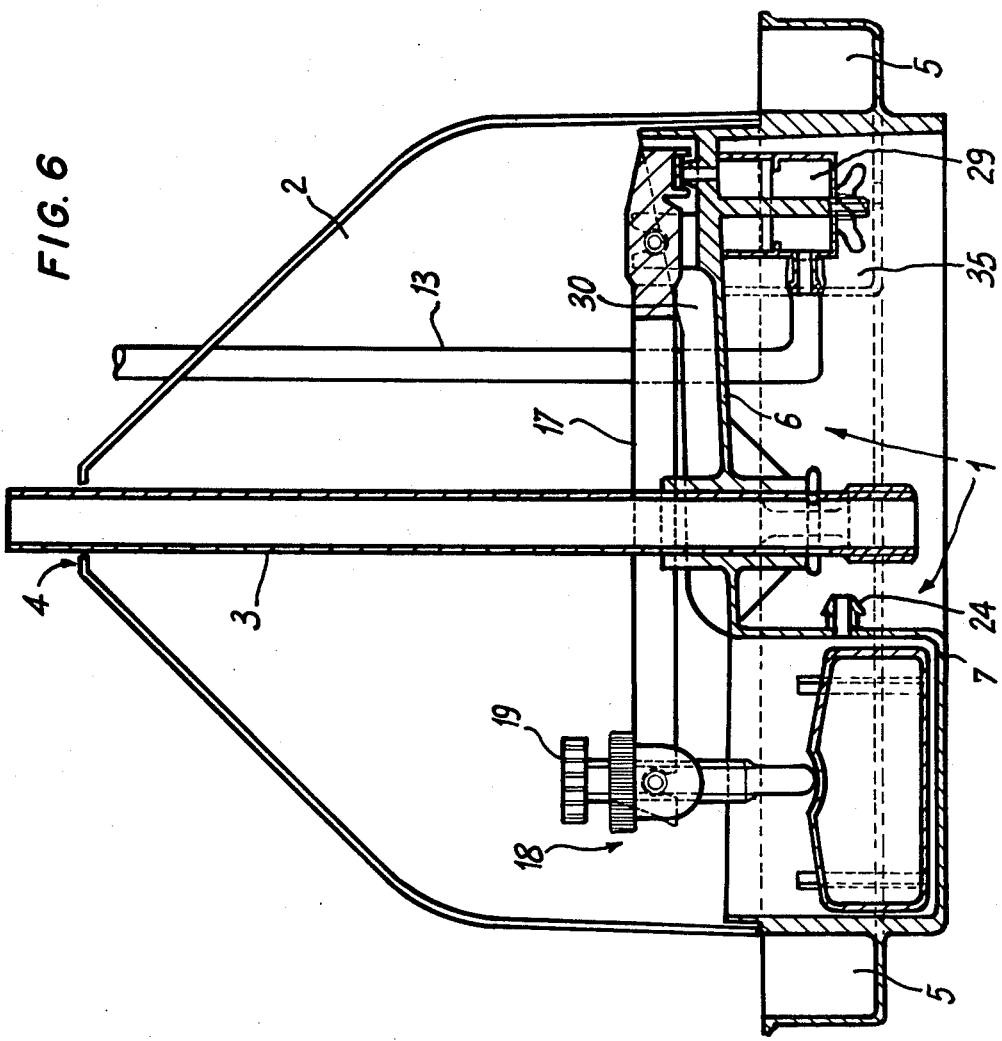

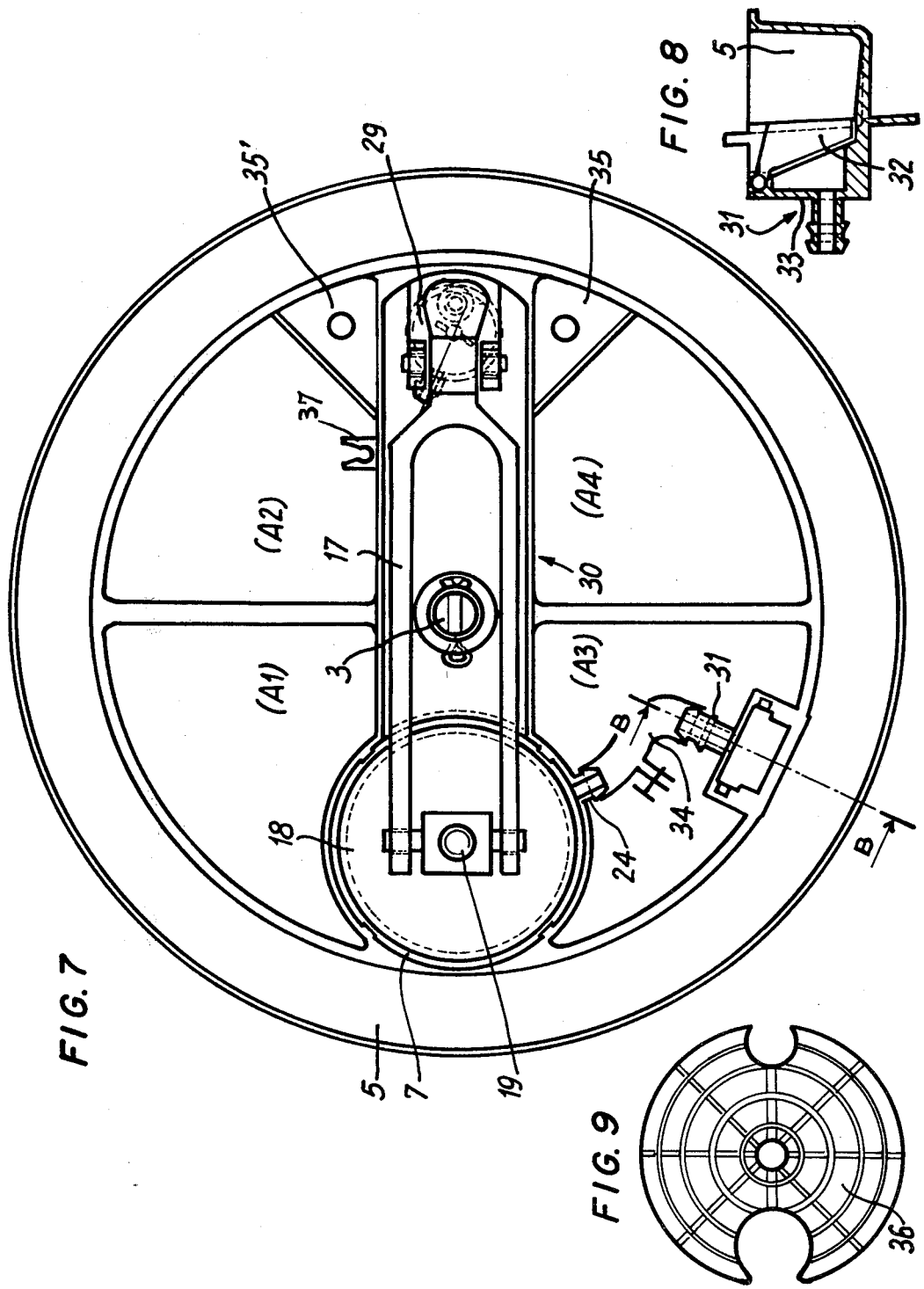

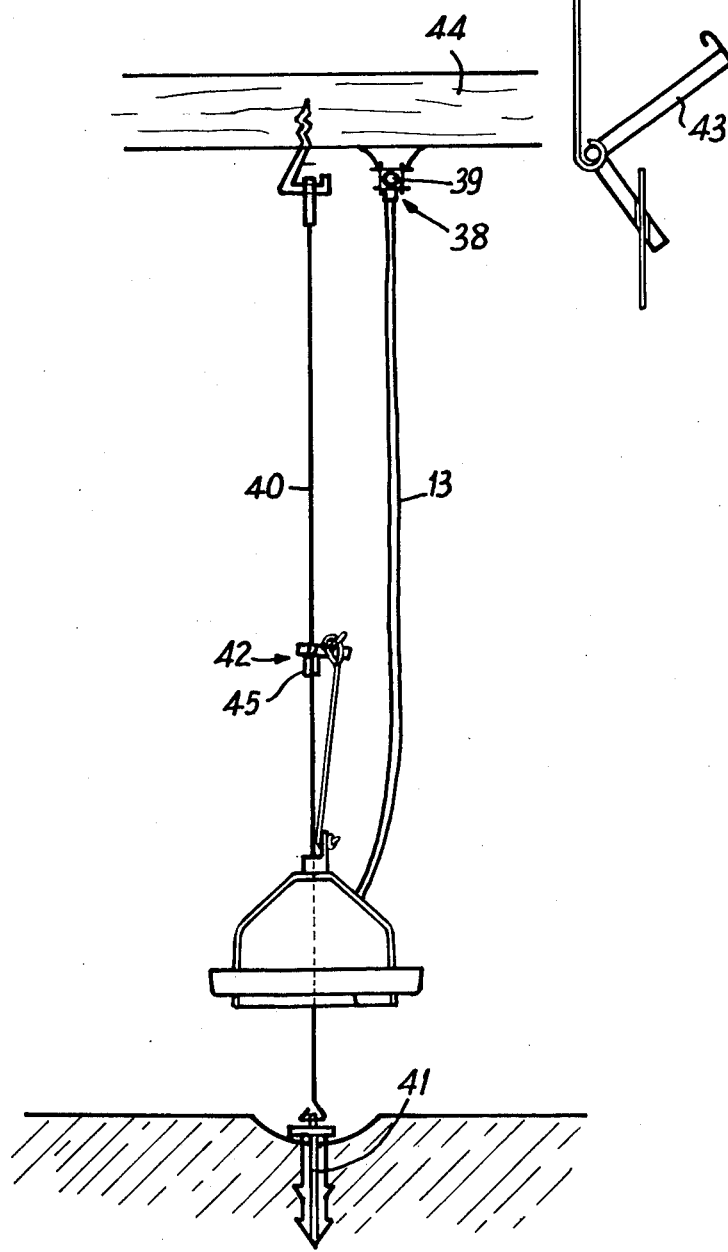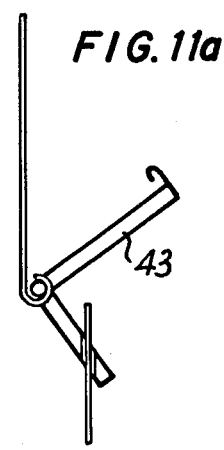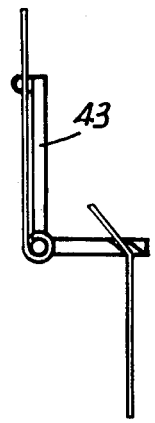

DRINKING TROUGH FOR POULTRY

FIELD OF THE INVENTION

This invention relates to the field of drinking troughs or the like, intended for farm-yard animals. In particular it relates to a new drinking trough for all types of poultry such as chicks, young guinea fowl, ducks, etc. which is suitable, by combining several units, for making groups of drinking troughs for both young and grown poultry especially in intensive raising facilities.

BACKGROUND OF THE INVENTION

Numerous devices intended to supply poultry, rabbits and other small animals with water in industrial production units have already been described and marketed. These drinking troughs, which can be set on the ground or suspended, generally consist of troughs or pans whose central part has a cover with slanted walls to keep the animals from congesting this sector. The water is supplied either manually or in a continuous, semiautomatic fashion.

Each of these devices exhibits advantages and drawbacks but, in general, often are blocked by debris which necessitates frequent cleaning and rinsing that require much labor. Furthermore, water often overflows the pans, leading to bacteria and other contamination which causes illness among the livestock.

PRIOR ART

A number of improvements have already been made by the applicant to eliminate these drawbacks and for this purpose French patent No. 76.22332 and its two Certificates of Addition Nos. 77.02899 and 77.12532 which describe an improved drinking trough comprising various embodiments can be advantageously referred to.

It has now been discovered that the efficiency can be further improved and possibilities for using drinking troughs of the types referred to above can be extended by the development of a water distributor which, combining new design elements with known means, makes it possible to supply various types of poultry from very young age to market size while considerably reduce time, start-up work and maintenance.

SUMMARY OF THE INVENTION

According to the invention the new drinking trough is of general type comprising the combination of a lid or cover in the shape of a truncated cone and a trough or peripheral circular trough fed with water at a constant level. According to its most general definition, the lid is open at its upper end, allowing the passage of a hollow shaft and on which the base or plate of the drinking trough is screwed and whose two ends are shaped as a trough and of which one part is straight and slanted while the other part forms a cavity equipped with a water outlet nozzle; intake and circulation of water being assured by a flexible pipe and a float adjustable in height.

In the embodiment of such a drinking trough, the plate can be solid and made of molded plastic. The water supply, introduced by flexible piping passing through a hole in the cover, is advantageously controlled by a needle valve that operates the arm of a float, adjustable in height, located in the cavity of the plate that constitutes a water tank. Further, this cavity communicates through an orifice with a circular trough intended to receive the water supply at a constant level for the poultry.

According to a particularly advantageous variant, the plate of the drinking trough is equipped with openings or recesses on the areas of its surface which surround the central float tank device and water supply system. Thus a savings in weight and material is achieved. Further, it is possible with a single mold, to make directly a plate having, on the one hand, the nozzle on the cavity of the float and, on the other hand, the water distribution device in the trough. This water distribution device is equipped with a check valve that prevents the return of polluted water into the tank or reservoir of the float.

BRIEF DESCRIPTION OF THE DRAWINGS

Numerous other details, characteristics, and variants in design will appear in the description which follows relating to nonlimiting embodiments illustrated by the accompanying drawings which diagrammatically represent:

FIG. 1: a profile view, in section, of the main parts of a drinking trough according to the invention;

FIG. 2: a view in projection on the horizontal plane of the same drinking trough;

FIG. 3: a trough with a small, built-in gutter for feeding chicks;

FIGS. 4 and 5: variant embodiments of troughs for adapting to various special cases;

FIG. 6: a profile view, in section, of the essential elements of another drinking trough improved according to the invention;

FIG. 7: a top view, in horizontal projection, of the same drinking trough as in FIG. 6;

FIG. 8: a section along BB of an embodiment detail of FIG. 7;

FIG. 9: a protective grill which can be installed under the bottom of the plate of the drinking trough;

FIGS. 10 and 11: an illustrative mode of suspending a drinking trough in a unit for raising poultry.

DESCRIPTION OF THE PREFERRED EMBODIMENTS

As represented in FIGS. 1 and 2, the drinking trough has a body (or base) 1 covered by a conical cover 2 able to be screwed on a threaded rod 3 which goes through the cover or lid 2 by opening 4. In general, the drinking trough is raised in relation to the ground as a result of a cement or similar base (not represented) whose end can be screwed to the lower part of rod 3; the adjustment in height is easily performed by rotating body 1 around said rod.

Base 1 whose ends are bent in a U to constitute a circular trough 5 exhibits a special shape; first, straight and sloping at 6, it becomes hollow to define a cavity 7 that constitutes a water tank which communicates through an opening 8 with trough 5. At a point in the reinforced wall 9 of the latter a multidirectional nozzle is provided, for example, a cross-threaded tube 10, which fits into a hole 11 at the same level as opening 8. Thus, attached drinking troughs of more moderate size for young poultry can be continuously fed in series. At this place, trough 5 is hollowed out into a recess 12 so as to collect the dirt and prevent it from obstructing the flow of water through 11.

The general supplying of water for the drinking trough is done by a flexible piping 13 which, introduced in a hole 14, is adapted for threaded needle 15 of valve 16 which operates by arm 17 and float 18 which is adjustable in height by threaded rod 19. The water can therefore be shut off at the desired level and can feed at a constant level, by cavity 7, trough 5, and said attached drinking troughs.

According to the embodiment illustrated in FIG. 3, trough 5 can receive a small, additional gutter 20 which is hooked on the walls of the trough. This gutter, whose shape can be suited to the type of young poultry to be raised, is equipped with a hole 21 which makes the passage of water possible. Thus, chicks (for example) have feed tanks suited to their size and do not risk accidental drowning.

According to an advantageous design variant of the drinking trough according to the invention, trough 5 can be cut at the base of the first branch of the U and can be replaced by other tanks corresponding to the desired shape and use. For example, in FIG. 4 can be seen a galvanized gutter 22 which rests on shoulder 23 of the drinking trough body and replaces original trough 5. In this case, the supplying of water to gutter 22 is done by a piping that connects nozzle 24 provided on body 1 of the drinking trough and outlet 25 made at the base of the outside wall of gutter 22.

FIG. 5 illustrates another variant (among other possibilities where a gutter 26, substituting for trough 5, is equipped with partitions 27 intended to direct the beaks of certain animals as, for example, ducks. Of course, these partitions or fins—which were also provided for in said 2nd certificate of addition (No. 77.12532)—can be installed all along the inside of troughs 5 or their replacement gutters so as to divide the water tanks into compartments that prevent the jostling of the chicks or other poultry which crowd around the drinking trough.

According to the variant embodiment illustrated in FIGS. 6 to 9, plate 1 is hollowed out, areas $A_1$, $A_2$, $A_3$, and $A_4$, being totally indented scalloped. In its center part this plate supports float 18 with threaded head 19 whose lever arm 17 rests on the water distribution system. According to this system, the clean water which arrives by tube 13 runs into a filtering decanter 29, then passes through guides 30 and reaches reservoir 7 of the float. It is then distributed in trough 5 by distributor 31 which is equipped with a valve 32 with support 33 intended to prevent the return of polluted water to reservoir 7; this distributor came from molding directly with the plate when the plate is formed of plastic. By installing a T tap on flexible tube 34 with junction between nozzles 24 and 31, an auxillary supply can be provided for chicks.

Advantageously, on each side of filtering decanter 29 can be placed small tanks 35 and 35' equipped with ballast (for example, peddles or the like) intended to be used as counterweight by balancing the mass of water contained in tank 7 of the float. Furthermore, a protective grill 36, such as that, for example, represented in FIG. 9, can be interposed between the stop of center threaded tube 3 and the bottom of the drinking trough so as to prevent the introduction of various debris into sloping base 6 and the tank of float 7. It will be noted that element 37, which can be seen in FIG. 7, represents the attaching system for flexible piping 13 for the intake of clean water.

FIGS. 10 and 11a–11b illustrate a preferred, but non-limiting, way of suspending a drinking trough above the ground according to the invention; a series of similar drinking troughs can be placed in the same fashion in an intensive poultry raising installation.

The water supply pipe 39 of the drinking trough is connected to junction 38 directly engaged with general water supply pipe 13 in the installation. Central tube 3 of the drinking trough is traversed by an iron (or similar) wire 40 connected to the top at a beam or ceiling 44 and attached by the lower part to the ground or to a stake 41. An attaching system 42 with groove and small cord is provided along wire 40 to keep the drinking trough suspended. To prevent the latter from being raised by the poultry, a stop 45 has been provided that makes it possible to determine the height at which the slide is wedged. Furthermore, a tensioning device 43, seen in FIGS. 11a and 11b, can be advantageously provided to adjust the tension of wire 40.

Of course, the invention also includes other possible variants, not represented but that obtain an equivalent result. For example, the hollow rod can be non-threaded and then be attached to body 1 and to the base (if the apparatus is raised with respect to the ground) by any known means, such as a ring or pin, or the like. Furthermore, the multidirectional nozzle can be provided, not at (10) as indicated in FIGS. 1 and 2, but on outlet (24) of cavity (7).

I claim:

1. A water distributor for poultry, comprising in combination:
   trough means, including inlet means and outlet means;
   means for supplying water to said trough inlet means, including means for maintaining the supplied water at a constant level and means for circulating the supplied water;
   truncated conical cover means having an open upper end;
   a rod attached to the base of the distributor and extending upwardly through said open upper end of said cover, said distributor being alternatively supportable on, or in elevated position above, the ground; and
   said trough means further including scalloped plate means forming recessed areas and having in one of said areas a water distributor including a non-return valve connected to said outlet means, and a T-tap for the supply of water for drinking troughs for chicks.

2. The combination of claim 1, wherein said rod is threaded at its lower end and able to be screwed on a base set on the ground to raise the distributor and to allow passage of a means for connection between a high hanging point and the ground to avoid any swinging of the distributor; and wherein said rod is equipped with a notch to hang a cover when the distributor is cleaned.

3. The combination of claim 1, and a suspension system comprising wire for hanging the distributor above the ground, and tension regulator means for adjusting the height of said wire.

4. The water distributor of claim 1 wherein
   said trough means further includes a straight and sloping first part, and a second part forming a cavity, said outlet means comprising a nozzle located in said cavity, and said water distributor further including means permitting series installation thereof;
   said maintaining means and said circulating means comprising flexible pipe means and float means.

5. The combination of claim 4, wherein the flexible pipe means is connected to the float means by a filtering decanter.

6. The combination of claim 5, wherein the sloping first part supports on each side of the decanter reservoirs equipped with ballast used as counterweights for the mass of water stored in the housing cavity for the float means.

7. The combination of any one of claims 1, 5 or 6, wherein a grill for protection against waste products is interposed between the rod and the bottom of the distributor.

* * * * *